(12) United States Patent
Beskrovny et al.

(10) Patent No.: US 8,839,351 B2
(45) Date of Patent: *Sep. 16, 2014

(54) EFFECTIVE TESTING OF AUTHORIZATION LOGIC OF WEB COMPONENTS WHICH UTILIZE CLAIMS-BASED AUTHORIZATION

(75) Inventors: Evgeny Beskrovny, Herzelyia (IL); Omer Tripp, Herzelyia (IL)

(73) Assignee: International Business Machines Corporation, Armonk, NY (US)

( * ) Notice: Subject to any disclaimer, the term of this patent is extended or adjusted under 35 U.S.C. 154(b) by 88 days.

This patent is subject to a terminal disclaimer.

(21) Appl. No.: 13/411,898

(22) Filed: Mar. 5, 2012

(65) Prior Publication Data

US 2013/0091541 A1 Apr. 11, 2013

Related U.S. Application Data

(63) Continuation of application No. 13/253,649, filed on Oct. 5, 2011.

(51) Int. Cl.
*G06F 21/00* (2013.01)

(52) U.S. Cl.
USPC .......................... 726/1; 726/8; 726/9; 726/20

(58) Field of Classification Search
USPC .......................................... 726/1, 8, 9, 20, 27
See application file for complete search history.

(56) References Cited

U.S. PATENT DOCUMENTS

| 8,539,500 B2* | 9/2013 | Ghosh et al. ................... 718/104 |
| 2005/0262487 A1 | 11/2005 | Pistoia et al. |
| 2007/0261124 A1 | 11/2007 | Centonze et al. |
| 2008/0263652 A1* | 10/2008 | McMurtry et al. ................. 726/9 |
| 2009/0100415 A1* | 4/2009 | Dor et al. ....................... 717/131 |
| 2009/0112975 A1* | 4/2009 | Beckman et al. ............. 709/203 |
| 2009/0249305 A1* | 10/2009 | Li et al. ......................... 717/130 |
| 2012/0060142 A1* | 3/2012 | Fliess et al. ................... 717/102 |
| 2012/0110589 A1* | 5/2012 | Ghosh et al. ................... 718/104 |

OTHER PUBLICATIONS

"Office Action" issued by DE Patent Office; Dec. 10, 2013.
Di Lucca, Guiseppe A., et al. "Testing Web-based Applications: The state of the art and future trends". Apr. 12, 2006, www.sciencedirect.com.
"Examination Report". Dec. 5, 2013.

* cited by examiner

*Primary Examiner* — Mohammad A Siddiqi
(74) *Attorney, Agent, or Firm* — Patents on Demand P.A.; Brian K. Buchheit; Scott M. Garrett

(57) ABSTRACT

An authorization algorithm of a software component can be selected. A static code analysis can be performed to determine a conditional statement within an algorithm of the software component. The outcome of the conditional statement can be established based on an input and a criteria using dynamic code analysis. The input can be a value associated with a claim set of a claims-based authentication policy. The criteria can be an authentication criteria specified within the algorithm. Responsive to the outcome, an execution path associated with the outcome can be determined and a code coverage criterion can be met for the conditional statement.

12 Claims, 4 Drawing Sheets

EFFECTIVE TESTING OF AUTHORIZATION LOGIC OF WEB COMPONENTS WHICH UTILIZE CLAIMS-BASED AUTHORIZATION

CROSS REFERENCE TO RELATED APPLICATIONS

This application is a continuation of U.S. patent application Ser. No. 13/253,649, filed Oct. 5, 2011 (pending), which is incorporated herein in its entirety.

BACKGROUND

The present invention relates to the field of and Web service security.

Many organizations depend on Web-based software (e.g., Web application) to run their business processes, conduct transactions, and deliver increasingly sophisticated services to customers. Every Web application (e.g., Web service) destined for online deployment frequently addresses security issues as an integral part of the software delivery process. Unfortunately, in the race to meet deadlines and stay ahead of the competition, many businesses fail to perform adequate security testing. This often results in vulnerabilities providing ample opportunity for unauthorized users to access or steal corporate and/or personal data. That is, security flaws within Web services can place employees and the business at risk. The most efficient way to stay ahead of application security vulnerabilities is to build software securely, from the ground up.

The business logic carried out by components of Web services often places restrictions on users of that component. For example, if a Web service is used for alcohol sale, then the age of the user should be verified to decide whether that person is eligible for service. A recent solution to this problem is an approach which utilizes "claims-based authorization". Claims-based authorization specifies processes for validating relevant details about the user (e.g., age) of the Web component. The Web service defines a set of criteria (e.g., age) that the user must satisfy, which is known as the claim set. For each criterion in this set, there is an entity the Web service trusts, which can provide information about the user with respect to that criterion. This entity is referred to as the token issuer, where the token holds the information the Web service can use to authenticate the user. To authorize a user, the Web service can request a suitable set of tokens (e.g., Security Assertion Markup Language tokens), where each token contains a certain claim set. The Web service can inspect the information stored inside the tokens, and based on results of the inspection can decide to serve the user.

Testing authorization logic carried out by a Web service which uses claims-based authorization can be challenging. One hurdle to testing authorization logic is that the range of values corresponding to each claim can be unbounded. For example, the claim can assume string values corresponding to names or allowed actions. Thus, testing a Web service using simple enumeration of all the possible values for all the relevant claims can be time consuming, resource intensive and error prone. That is, "brute force" testing can be a non-viable strategy.

BRIEF SUMMARY

One aspect of the present invention can include a system, an apparatus, a computer program product, and a method for effective testing of authorization logic of Web components which utilize claims-based authorization. An authorization algorithm of a software component can be selected. A static code analysis can be performed to determine a conditional statement within an algorithm of the software component. The outcome of the conditional statement can be established based on an input and a criteria using dynamic code analysis. The input can be a value associated with a claim set of a claims-based authentication policy. The criteria can be an authentication criteria specified within the algorithm. Responsive to the outcome, an execution path associated with the outcome can be determined and a code coverage criterion can be met for the conditional statement.

Another aspect of the present invention can include an apparatus, a computer program product, a method, and a system for effective testing of authorization logic of Web components which utilize claims-based authorization. A testing engine can be configured to perform at least one of a functional and non-functional assessment of an authentication layer of a software component. The non-functional assessment can be a validation of one or more authentication algorithms associated with the software component. The authentication algorithms can be associated with a claims-based authentication policy. One or more of the claims associated with the claims-based authentication policy can be an unbounded value. A data store can be able to persist and aggregate static and dynamic analysis results of the assessment of the authentication algorithm to enable multiple views of the authentication algorithm execution.

DETAILED DESCRIPTION

Figure 1A:
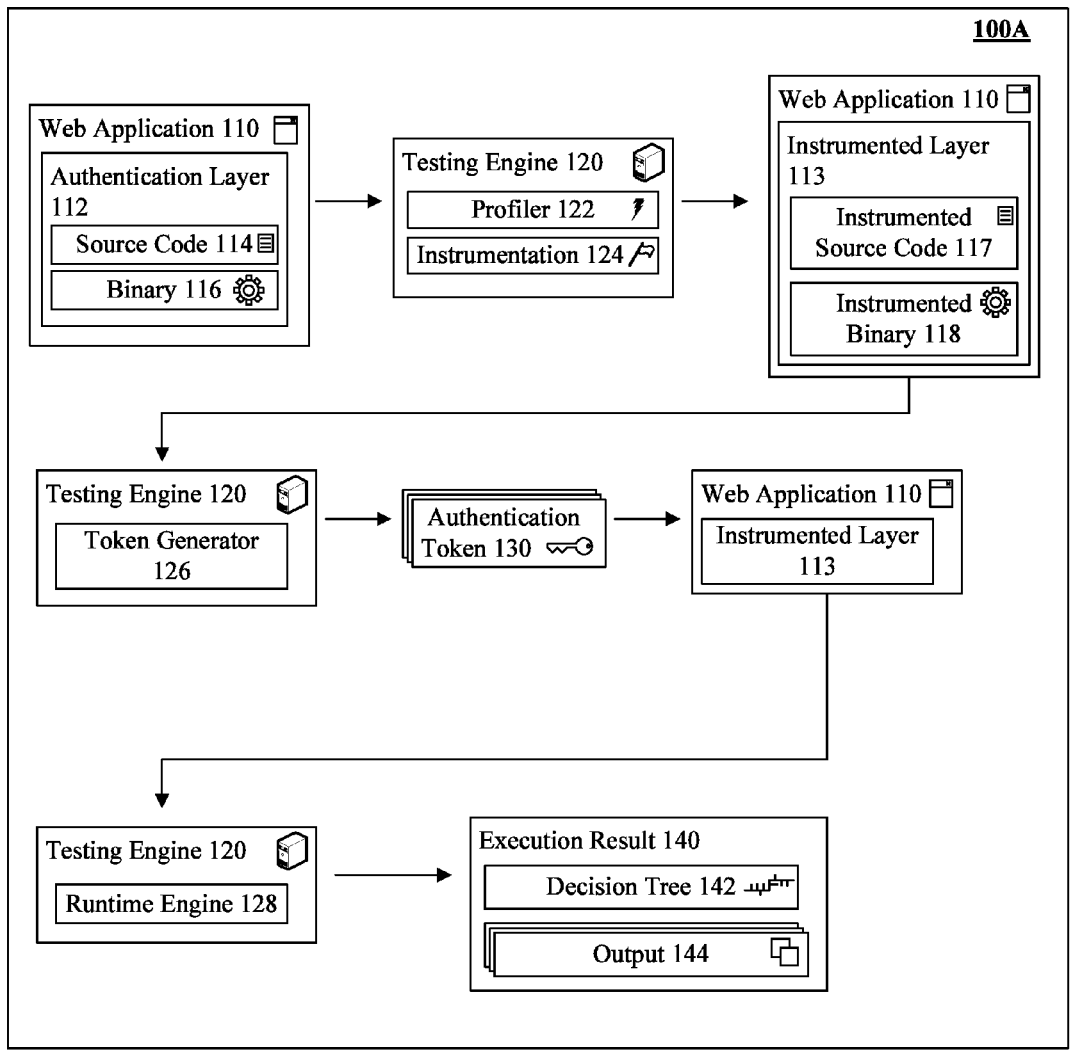
FIG. 1A is a schematic diagram illustrating a flow for effective testing of authorization logic of Web components which utilize claims-based authorization in accordance with an embodiment of the inventive arrangements disclosed herein.

The present disclosure is a solution for effective testing of authorization logic of web components which utilize claims-based authorization. In the solution, a testing engine can be utilized to validate the functioning of an authorization layer of a Web component software (e.g., Web service). That is, the engine can aid in quality assurance practices which aim to produce defect free security components. The disclosure can utilize static and dynamic code analysis to exhaustively test authorization elements within a Web service. In one instance, the testing engine can automatically produce tokens which conform to testing guidelines and/or rulesets. In the instance, tokens can be utilized to validate authorization layer operation. For example, tokens can conform to a Web service Trust (WS-Trust) specification which can be used to completely test an authorization algorithm. A quantitatively sufficient amount of tokens can be generated to permit the testing of each code path of the authentication layer. The tokens can be inputted into the layer causing the evaluation of each conditional statement within the authentication layer against valid and non-valid values (e.g., valid user input, invalid user input). That is, a wide gamut of scenarios can be rapidly and easily tested against Web services which utilize claims-based authorization.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1A is a schematic diagram illustrating a flow 100A for effective testing of authorization logic of Web components which utilize claims-based authorization in accordance with an embodiment of the inventive arrangements disclosed herein. Flow 100A can be present in the context of example 100B, method 200, and system 300. In flow 100A static and dynamic software testing techniques can be employed to exhaustively test authentication layer 112 of Web application 110. Testing engine 120 can provide instrumentation for source code 114 and/or binary 116 which can be utilized to determine relevant portions (e.g., conditional statements) of layer 112 which can be tested. Instrumentation can be injected into layer 112 which can result in instrumented layer 113 being created. Engine 120 can generate authentication tokens 130 to test relevant portions of layer 113. Based on the results of layer 113 execution an execution result 140 can be produced.

As used herein, Web application 110 can be an application which can be accessed over a network including, but not limited to, an Internet, an intranet, and an extranet. In one instance, application 110 can be a Web service. Application 110 can be presented within a browser-controlled environment (e.g. a JAVA applet), coded in a browser-supported language (e.g., JAVASCRIPT, combined with a browser-rendered markup language), and can be reliant on a common Web browser to render the application executable. For example, application 110 can be a Rich Internet Application (RIA). Application 110 can be hosted within a Web application server (e.g., Web application server 350) and can provide services to an end-point client device (e.g., desktop computer), end-point server devices (e.g., server), and the like. Application 110 can be associated with a software framework such as a Web framework. Application 110 can include, but is not limited to, authentication layer 112, business logic layer (not shown), and the like.

Authentication layer 112 can be a software component including one or more algorithms for performing claims-based authentication. Authentication layer 112 can be associated with source code 114, binary 116, and the like. Source code 112 can be a human-readable document associated with one or more computer languages, including, but not limited to JAVA, PHP Hypertext PreProcessor (PHP), C++, Hypertext Markup Language (HTML), Dynamic HTML, and the like. For example, source code 112 can be a JAVA source code file. Binary 116 can be a machine readable document associated with machine code and/or intermediate representation code. For example, binary 116 can be a JAVA byte code file.

Source code 114 and/or binary 116 can be conveyed to testing engine 120 which can utilize profiler 122 to instrument layer 112 (e.g., code 114 and/or binary 116). Profiler 122 can utilize traditional and/or proprietary profiling techniques to instrument layer 112. Profiler 122 can analyze code 114 and/or binary 116 to produce appropriate instrumentation 124. For example, profiler 122 can identify string comparisons (e.g., starts-with, contains, equals) and/or numerical comparisons (e.g., $<$, $<=$, $>$, $>=$) which are associated with conditional statements. Instrumentation 124 can be customized software code for detecting conditional statement execution, function invocations, object creation, and the like. For example, instrumentation 124 can include executable code for setting an entry and an exit point within a function, permitting statistical data (e.g., number of times a function has been called) to be collected. That is, instrumentation 124 can be utilized to perform traditional code coverage criteria (e.g., decisions coverage, condition coverage), compute metrics, and the like. Instrumentation 124 can be appropriately inserted into layer 112 resulting in the creation of instrumented layer 113. Instrumented layer 113 can include, instrumented source code 117 and/or instrumented binary 118.

In one instance, profiler 122 can generate instrumentation 124 and can modify source code 114 to place instrumentation 124 within source code 114. In the instance, the instrumented binary 118 can be created (e.g., compiled from instrumented source code 117) from the instrumented source code 114.

Token generator 126 can utilize instrumented layer 113 to generate relevant authentication token 130 which can be employed to test layer 113. Authentication token 130 can be a security token associated with a claims-based authentication mechanism. Token 130 can include, but is not limited to, assertions, protocols, bindings, profiles, and the like. In one instance, token 130 can be a (Security Assertion Markup Language) SAML token. In the instance, the token 130 can include, but is not limited to, authentication statements, attribute statements, authorization decision statements, and the like. That is, token 130 can include attributes with testing values which can be utilized to validate layer 113 functioning.

Example 100B illustrates a token generation scenario from source code 114. In the scenario, source code 114 can be an e-commerce Web site authorization logic for the sale of alcohol. The conditional statement 160 can permit the login of a user to the e-commerce Web site if the authorization token identifies the user as over the age of eighteen. That is, conditional statement 160 can be analyzed to determine an authorization value which can be evaluated against a constant (e.g., integer value eighteen). An authorization token 130 (e.g., Token A1) can be generated with a value of twenty to test the successful (e.g., TRUE) evaluation of statement 160. It should be appreciated that multiple tokens (e.g., A1-A3) can be generated to test each potential execution paths associated with statement 160.

In one embodiment, to exercise all possible control-flow paths of source code 114 where source code includes n tests (e.g., statements 160, 162, 164), each result can be represented using an array of length n (e.g., $[t\_1, \ldots, t\_n]$) where $t\_i$ is the result of test i. Each feasible result array can be obtained by synthesizing appropriate values for the claims in the token. For example, if the token contains two claims (e.g., age, username), four different inputs can be crafted corresponding to a value below/above eighteen for the age and a name that corresponds to a registered user and a non-registered user. The embodiment can enable exhaustive testing of the Web component's authorization logic even in the case of a parameter whose set of legal values can be unbounded. Furthermore, for each array of test results, execution of business logic of the Web component can be determined using instrumentation (e.g., instrumentation 124).

Token 130 can be inputted into instrumented layer 113 which can be executed by runtime engine 128. Execution of layer 113 can produce in execution result 140. Result 140 can be one or more data sets associated with the execution of layer 113. Result 140 can include, but is not limited to, decision tree 142, output 144, and the like. Decision tree 142 can be a data model identifying the execution of layer 113. Tree 142 can include, but is not limited to, a text document, a graphical illustration, and the like. Output 144 can include, but is not limited to, program generated output, instrumentation generated output, debugging information, logging information, and the like.

Drawings presented herein are for illustrative purposes only and should not be construed to limit the invention in any regard. In flow 100A, application 110 architecture can include, but is not limited to, Model-View-Controller (MVC), three tier architecture, and the like. It should be appreciated that multiple values can be present within each token 130 and example 100B illustrates a simplified scenario for the sake of clarity.

Figure 1B:
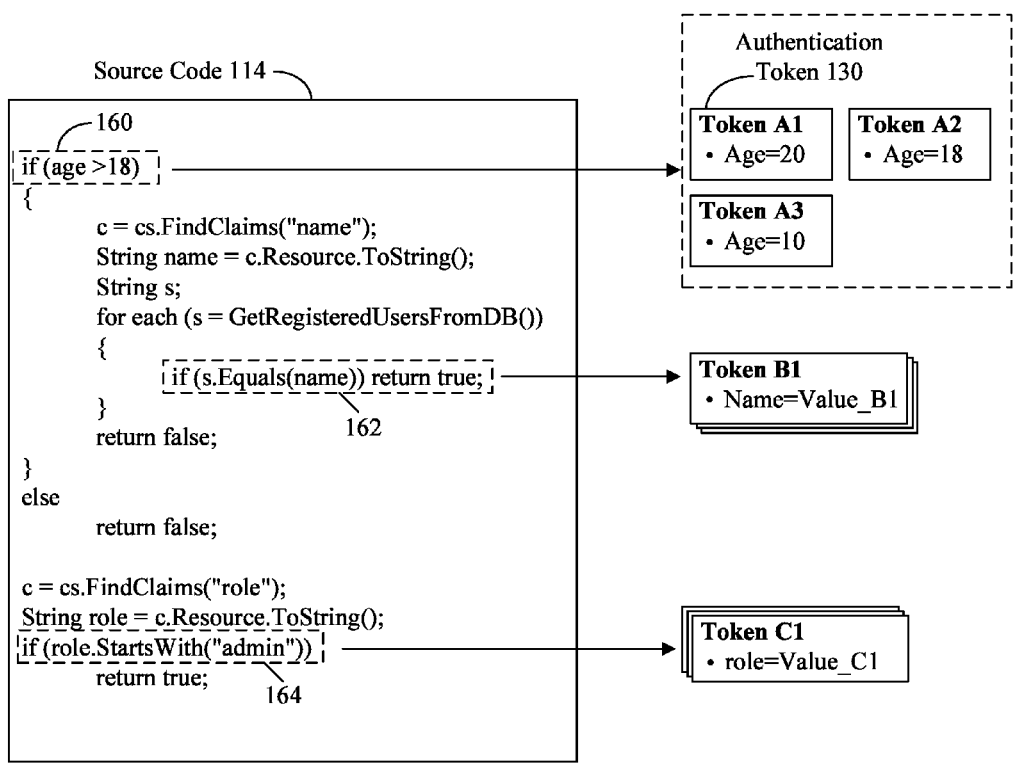
FIG. 1B is a schematic diagram illustrating an exemplary token generation from a source code for effective testing of authorization logic of Web components which utilize claims-based authorization in accordance with an embodiment of the inventive arrangements disclosed herein.

FIG. 1B is a schematic diagram illustrating an exemplary token generation from a source code for effective testing of authorization logic of Web components which utilize claims-based authorization in accordance with an embodiment of the inventive arrangements disclosed herein. In example 100B, source code 114 can be a portion of a JAVA source code associated with an authentication algorithm of a Web application (e.g., application 110). In one instance, tokens (e.g., A1-A3) can be stored within a single Extensible Markup Language (XML) document. In the instance, the XML document can be parsed sequentially for each token within the document. In one configuration of the instance, token A1-A3 can be stored as values within an XML document and can be used to dynamically construct tokens. In the configuration, a token generator can automatically wrap requisite token structure (e.g., creating well formed XML tokens) around values (e.g., "Age=10") during testing.

Figure 2:
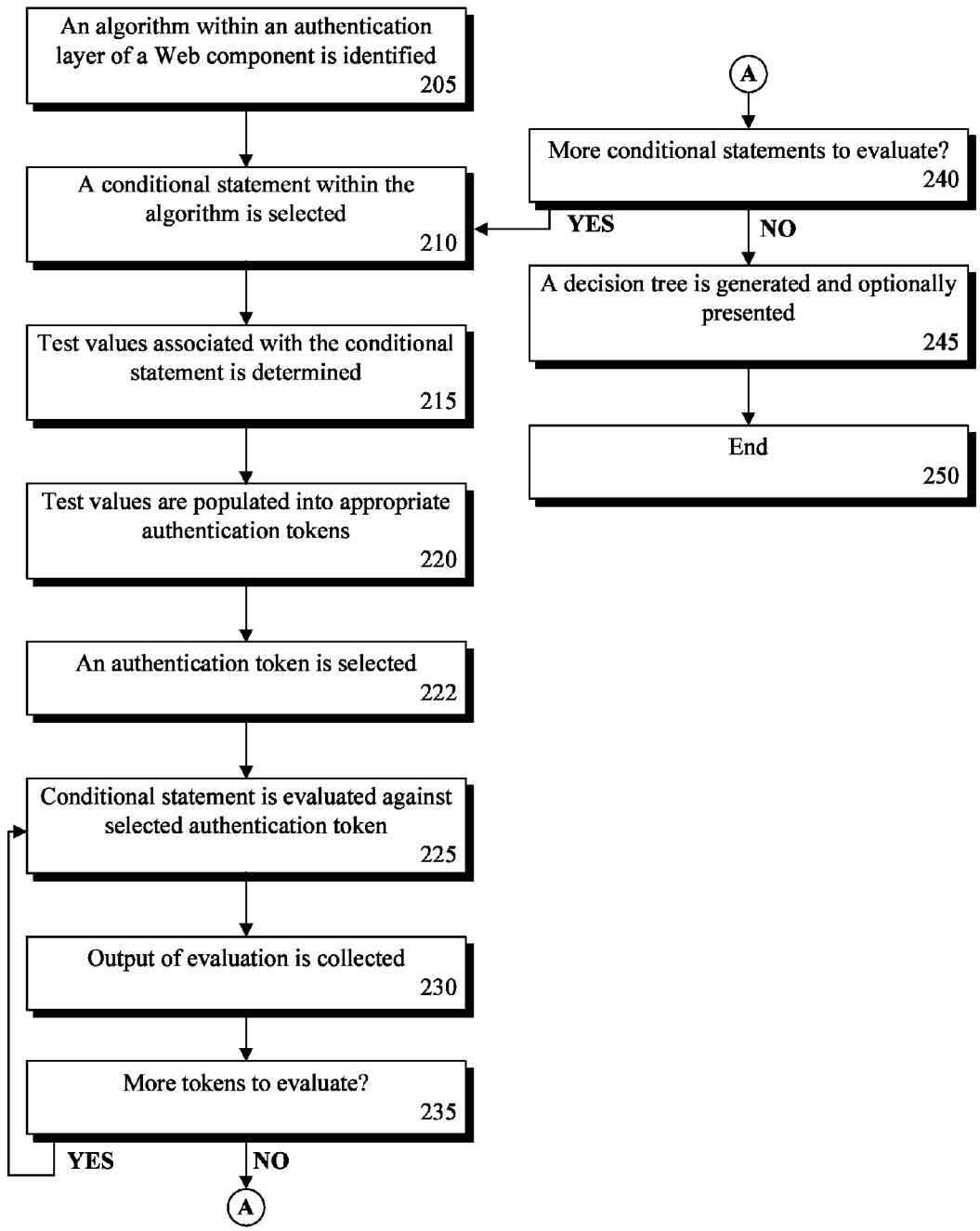
FIG. 2 is a schematic diagram illustrating a method for effective testing of authorization logic of Web components which utilize claims-based authorization in accordance with an embodiment of the inventive arrangements disclosed herein.

FIG. 2 is a schematic diagram illustrating a method 200 for effective testing of authorization logic of Web components which utilize claims-based authorization in accordance with an embodiment of the inventive arrangements disclosed herein. Method 200 can be performed in the context of flow 100A, example 100B, and/or system 300. In method 200, an algorithm within an authentication layer of a Web component (e.g., Web application) can be exhaustively tested. Testing can be performed programmatically by determining conditional statements associated with authentication. The conditional statements can be instrumented and tokens can be generated to evaluate each outcome of the statement. Based on condition coverage, a decision tree can be created which can be presented.

In step 205, an algorithm within an authentication layer of a Web component can be identified. The algorithm can be automatically and/or manually identified. It should be appreciated that the algorithm can include multiple algorithms, functions, classes, objects, and the like. In step 210, a conditional statement within the algorithm can be selected. Selection can be performed in execution order, statement complexity, and the like. In step 215, test values associated with the conditional statement can be determined. In one instance, a manual review process can be associated with test value determination to permit customized and/or focused testing. In step 220, test values can be populated into appropriate authentication tokens. In step 222, an authentication token can be se; selected. In step 225, the conditional statement can be evaluated against the authentication token. In step 230, output of the evaluation can be collected. In step 235, if there are more tokens to evaluate for the conditional statement, the method can return to step 225, else continue to step 240. In step 240, if there are more conditional statements to evaluate, the method can return to step 210, else continue to step 245. In step 245, a decision tree can be generated and optionally presented within a user interface. That is, the decision tree can be utilized to provide rapid visual feedback of algorithm testing. In step 250, the method can end.

Drawings presented herein are for illustrative purposes only and should not be construed to limit the invention in any regard. It should be appreciated that method 200 can be performed in real-time or near real-time. Further, method 200 can be performed in serial and/or in parallel. In one instance, the method 200 can be performed automatically during a software development lifecycle enabling security flaws to be quickly identified and removed.

Figure 3:
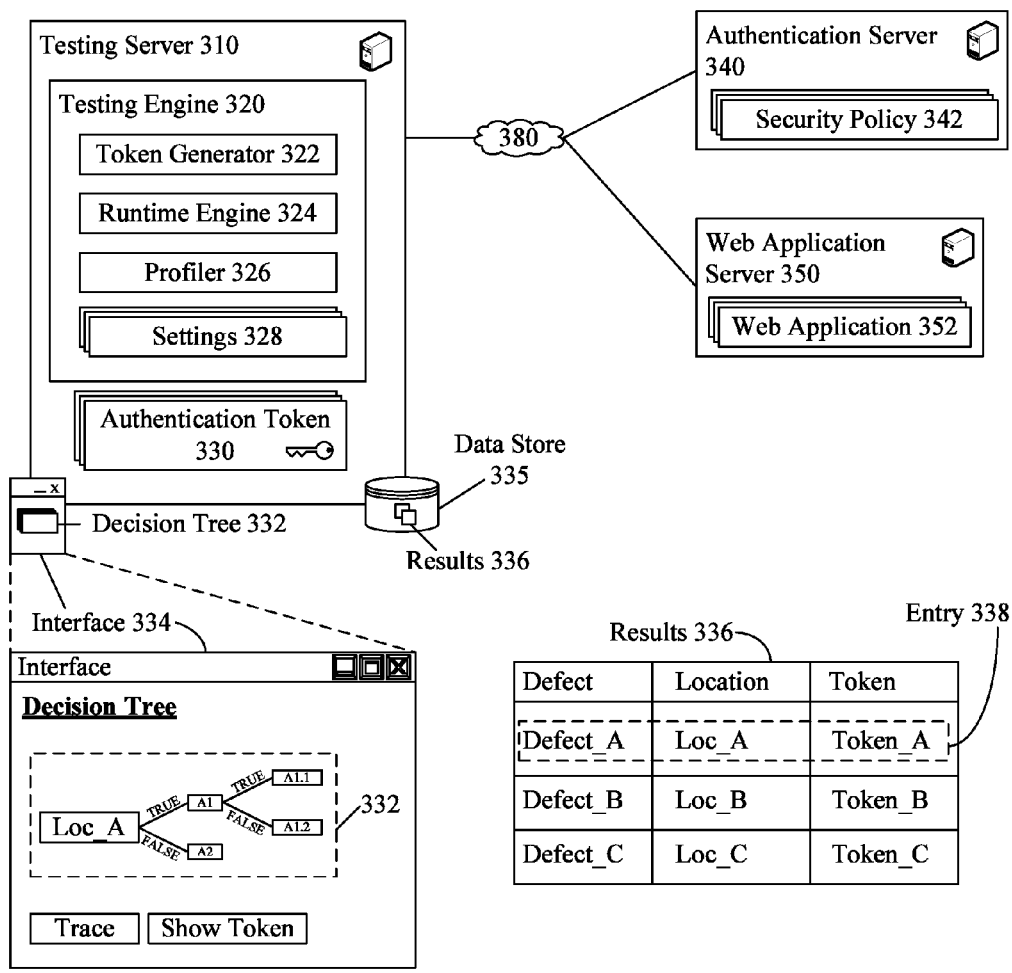
FIG. 3 is a schematic diagram illustrating a system for effective testing of authorization logic of Web components which utilize claims-based authorization in accordance with an embodiment of the inventive arrangements disclosed herein.

FIG. 3 is a schematic diagram illustrating a system 300 for effective testing of authorization logic of Web components which utilize claims-based authorization in accordance with an embodiment of the inventive arrangements disclosed herein. Method 300 can be present in the context of flow 100A, example 100B, and/or method 200. In system 300, a testing server 310 can aid in quality assurance practices (e.g., verification) associated with Web application 352. Application 352 can be associated with one or more security policies 342. Engine 320 of server 310 generate authentication tokens 330 which can be used to ensure authorization logic functions according to application 352 security requirements. That is, potential security flaws associated with a claims-based authentication mechanism can be automatically identified during a testing phase of an application 352 development. System 300 can be communicatively linked via network 380.

Testing server 310 can be a hardware/software element able to execute testing engine 320. Server 310 can include, but is not limited to, testing engine 320, authentication token 330, interface 334, data store 335, and the like. In one instance, server 310 can be an IBM RATIONAL APPSCAN server. Server capabilities can include, but is not limited to authoring tools (e.g., developer tracking), versioning functionality, security capabilities, and the like. It should be appreciated that server 310 can combine the automated correlation of static and dynamic analysis test results to provide novel capabilities for testing applications which utilize claims-based authentication.

Testing engine 320 can be a hardware/software component for performing static and dynamic program analysis of a Web application 352. Engine 320 can include, but is not limited to, token generator 322, runtime engine 324, profile 326, and the like. In one instance, engine 320 can be a networked component. In another instance, engine 320 can be a plug-in component of an integrated development environment. In the instance, engine 320 can be associated with a testing tooling. In one instance, engine 320 can be a functionality of an IBM RATIONAL APPSCAN TESTER EDITION software.

Token generator 322 can be a hardware/software entity for creating authentication token 330. Generator 332 functionality can include, but is not limited to, token 330 type determination, validating token 330 formation, communicating token 330, and the like. In one embodiment, generator 322 can communicate with authentication server 340 to determine an appropriate application 352 security policy 342. In the embodiment, generator 322 can determine policy 342 type and generate appropriate authentication token 330. In one embodiment, generator 332 can emulate an identity provider allowing application 352 to execute without reconfiguration. In the embodiment, generator 332 can automatically determine relevant identity provider settings (e.g., parsing configuration files) utilized by application 352 which can be used during testing to emulate an identity provider.

Runtime engine 324 can be a hardware/software element for executing application 352. Runtime engine 324 functionality can include platform virtualization, sandboxing, debugging, tracing, auditing, and the like. Engine 324 can select appropriate token 330 which can be inputted into application 352 during execution. Engine 324 can provide logging capabilities which can be utilized to generate results 336. In one instance, engine 324 can be communicatively linked to a defect tracking system. In one embodiment, engine 324 can automatically test a Web application 352 responsive to a "scan" action. In the embodiment, a scan action can be a user-initiated action within an IDE.

Profiler 326 can utilize a wide variety of techniques to collect data from application 352 during testing, including, but not limited to, hardware interrupts, code instrumentation, instruction set simulation, operating system hooks, and performance counters. In one instance, profiler 326 can be a call-graph profiler able to generate decision tree 332 during runtime. Profiler 326 functionality can include, but is not limited to, event-based profiling, statistical profiling, source code instrumentation profiling, interpreted instrumentation profiling, hypervisor/simulation profiling. It should be appreciated that although instrumenting Web application 352 can cause changes in the performance of the program, potentially causing inaccurate results and "heisenbugs", the instrumentation can be very specific (e.g., conditional statements) and can be carefully controlled to have a minimal impact.

Settings 328 can be one or more rulesets for establishing the behavior of server 310, engine 320, and/or system 300. Settings 328 can include, but is not limited to, token generator 322 settings, runtime engine 324 options, profiler 326 parameters, and the like. In one instance, settings 328 can include security policy 342 options, decision tree 332 settings, and the like. Setting 328 can be manually and/or automatically determined. In one instance, setting 328 can be configured via interface 334.

In one instance, token 330 can be associated with one or more encryption schemes. In the instance, token 330 can be associated with an Extensible Markup Language (XML) Encryption. Token 330 can be associated with a Single Sign On (SSO) Scheme which can include, but is not limited to, a Web browser, a user (e.g., principle), an authentication server (e.g., identity provider), and the like.

In one instance, security policy 342 can be associated with a Security Assertion Markup Language (SAML) profile. Policy 342 can be associated with one or more query-response protocols. Policy 342 can be associated with one or more bindings, including, but not limited to, Simple Object Access Protocol (SOAP), Hypertext Transport Protocol (HTTP), and the like. It should be appreciated that, security policy 342 can include traditional and/or proprietary claims-based authentication allowing the disclosure to be extensible and permit the testing of any claims-based security policies.

Web application server 350 can be a hardware/software component for storing and/or executing application 352. Server 350 can be associated with a development environment, production environment, and the like. In one embodiment, server 350 can be an IBM WEBPSHERE APPLICATION server.

Result 336 can be one or more datasets for tracking the outcome of application 352 testing. Result 336 can include, but is not limited to, log files, database records, binary files, multi-media files, and the like. In one instance, result 336 can be associated with a concurrent versioning system (CVS), defect tracking system, and the like. Result 336 can be associated with scan templates, user-defined output templates, and the like. For example, result 336 can be configured to present customized views of application 352 execution for each developer associated with the application 352.

In one embodiment, decision tree can be a call graph associated with a portion of application 352. In one instance, decision tree 332 can be linked to results 336 permitting a graphical representation of application testing 352 to be achieved. In the instance, nodes of the decision tree can correspond to entries within results 336. For example, entry 338 can indicate at a conditional statement (e.g., Loc_A) a defect exists when values associated with an authentication token (e.g., Token_A) is inputted. In one embodiment, selecting a node (e.g., conditional statement A1) within the decision tree can yield information about the execution of the code associated with the node. For instance, tokens used to evaluate the conditional statement A1 can be presented allowing a software developer to inspect token values which result in incorrect operation of application 352.

Interface 334 can be a user interactive component permitting interaction and/or presentation of decision tree 332. Interface 334 can be present within the context of a Web browser application, an integrated development environment (IDE), and the like. In one embodiment, interface 334 can be a screen of an IBM ECLIPSE IDE. Interface 334 capabilities can include a graphical user interface (GUI), voice user interface (VUI), mixed-mode interface, and the like. In one instance, interface 334 can be communicatively linked to computing device.

Data store 335 can be a hardware/software component able to persist result 336, authentication token 330, decision tree 332, and the like. Data store 335 can be a Storage Area Network (SAN), Network Attached Storage (NAS), and the like. Data store 335 can conform to a relational database management system (RDBMS), object oriented database management system (OODBMS), and the like. Data store 335 can be communicatively linked to server 310 in one or more traditional and/or proprietary mechanisms. In one instance, data store 335 can be a component of Structured Query Language (SQL) complaint database.

Network 380 can be an electrical and/or computer network connecting one or more system 300 components. Network 380 can include, but is not limited to, twisted pair cabling, optical fiber, coaxial cable, and the like. Network 380 can include any combination of wired and/or wireless components. Network 380 topologies can include, but is not limited to, bus, star, mesh, and the like. Network 380 types can include, but is not limited to, Local Area Network (LAN), Wide Area Network (WAN), Virtual Private Network (VPN) and the like.

Drawings presented herein are for illustrative purposes only and should not be construed to limit the invention in any regard. It should be appreciated that runtime engine 324 can be an optional component of engine 320. It should be appreciated that one or more components within system 300 can be optional components permitting that the disclosure functionality be retained. It should be understood that engine 320 components can be optional components providing that engine 320 functionality is maintained. It should be appreciated that one or more components of engine 320 can be combined and/or separated based on functionality, usage, and the like. System 300 can conform to a Service Oriented Architecture (SOA), Representational State Transfer (REST) architecture, and the like.

The flowchart and block diagrams in the FIGS. 1A-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:

one or more processors, executing program instructions of a non-transitory storage medium, selecting a conditional statement associated with a software component of a Web service by performing a static code analysis to determine the conditional statement within an algorithm of the software component;

one or more processors, executing program instructions of a non-transitory storage medium, determining test values associated with the conditional statement;

one or more processors, executing program instructions of a non-transitory storage medium, generating a set of security tokens based on the test values, wherein the set of security tokens is associated with a claims-based authentication policy, wherein the set of security tokens is populated with at least one of a value resulting in the evaluation of the conditional statement to be true or to be false;

one or more processors, executing program instructions of a non-transitory storage medium, determining an outcome of the conditional statement based on an input and a criteria using dynamic code analysis, wherein the input is a value associated with the claims-based authentication policy, wherein the criteria is an authentication criteria specified within the algorithm;

one or more processors, executing program instructions of a non-transitory storage medium, responsive to the determined outcome, creating a decision tree associated with the outcome; and one or more processors, executing program instructions of a non-transitory storage medium, presenting the decision tree within a user-interface.

2. The method of claim 1, further comprising dynamically instrumenting the conditional statement of the algorithm to determine a true condition and a false condition.

3. The method of claim 1, wherein the set of security tokens conforms to a Security Assertion Markup Language (SAML) token.

4. The method of claim 1, wherein the conditional statement is at least one of a string comparison and a numerical comparison.

5. The method of claim 1, further comprising:
one or more processors, executing program instructions of a non-transitory storage medium, conveying a notification indicating inconsistencies in the execution path of the algorithm.

6. The method of claim 1, wherein the claims-based authorization is a Web Service Trust (WS-Trust) specification.

7. The method of claim 1 further comprising:
one or more processors, executing program instructions of a non-transitory storage medium, profiling an authentication layer of the software component to create an instrumented layer, wherein the authentication layer contains code to be authenticated using the authorization algorithm, and wherein the instrumented layer comprises instrumented code for the static code analysis.

8. The method of claim 1, wherein the set of security tokens comprises authentication statements, attributes statements, and authorization decision statements.

9. The method of claim 1 further comprising:
one or more processors, executing program instructions of a non-transitory storage medium, establishing an output for the authorization algorithm, wherein the output comprises one of a program generated output, an instrumentation generated output, and a debugging information output.

10. The method of claim 1, wherein the outcome comprises log files, database records, binary files and multimedia records.

11. A computer program product comprising a non-transitory computer readable storage medium having computer usable program code embodied therewith, the computer usable program code comprising:
computer usable program code stored in a non-transitory storage medium, if said computer usable program code is executed by a processor it is operable to select a conditional statement associated with a software component of a Web service by performing a static code analysis to determine the conditional statement within an algorithm of the software component;
computer usable program code stored in a non-transitory storage medium, if said computer usable program code is executed by a processor it is operable to determine test values associated with the conditional statement;
computer usable program code stored in a non-transitory storage medium, if said computer usable program code is executed by a processor it is operable to generate a set of security tokens based on the test values, wherein the set of security tokens is associated with a claims-based authentication policy, wherein the set of security tokens is populated with at least one of a value resulting in the evaluation of the conditional statement to be true or to be false;
computer usable program code stored in a non-transitory storage medium, if said computer usable program code is executed by a processor it is operable to determine an outcome of the conditional statement based on an input and a criteria using dynamic code analysis, wherein the input is a value associated with the claims-based authentication policy, wherein the criteria is an authentication criteria specified within the algorithm;
computer usable program code stored in a non-transitory storage medium, if said computer usable program code is executed by a processor it is operable to create a decision tree associated with the outcome, responsive to the determined outcome; and
computer usable program code stored in a non-transitory storage medium, if said computer usable program code is executed by a processor it is operable to present the decision tree within a user-interface.

12. A system comprising:
one or more processors;
one or more non-transitory storage mediums;
computer usable program code stored in the one or more non-transitory storage mediums, if said computer usable program code is executed by the one or more processors it is operable to:
select a conditional statement associated with a software component of a Web service by performing a static code analysis to determine the conditional statement within an algorithm of the software component;
determine test values associated with the conditional statement;
generate a set of security tokens based on the test values, wherein the set of security tokens is associated with a claims-based authentication policy, wherein the set of security tokens is populated with at least one of a value resulting in the evaluation of the conditional statement to be true or to be false;
determine an outcome of the conditional statement based on an input and a criteria using dynamic code analysis, wherein the input is a value associated with the claims-based authentication policy, wherein the criteria is an authentication criteria specified within the algorithm;
create a decision tree associated with the outcome, responsive to the determined outcome; and
present the decision tree within a user-interface.

* * * * *